United States Patent Office 2,890,680
Patented June 16, 1959

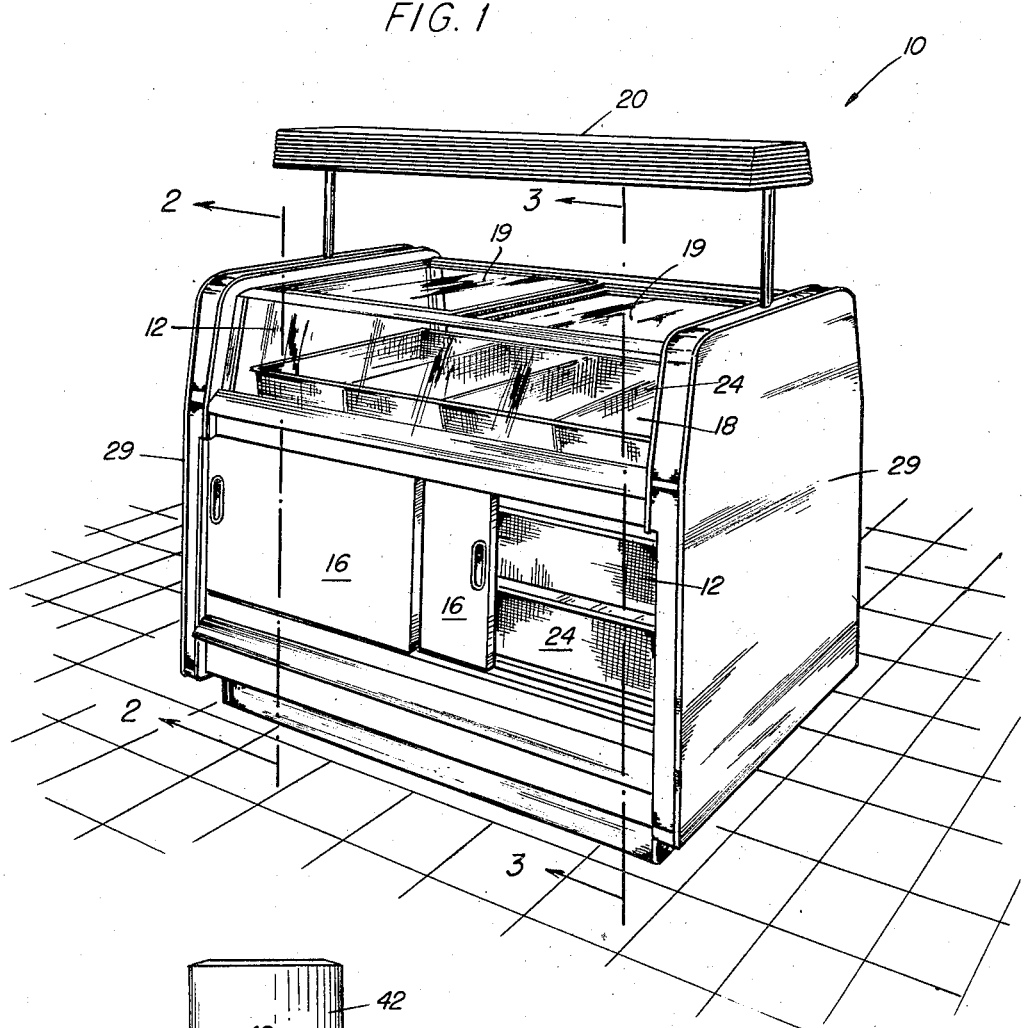
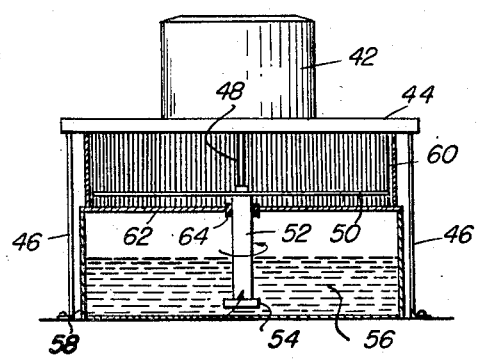

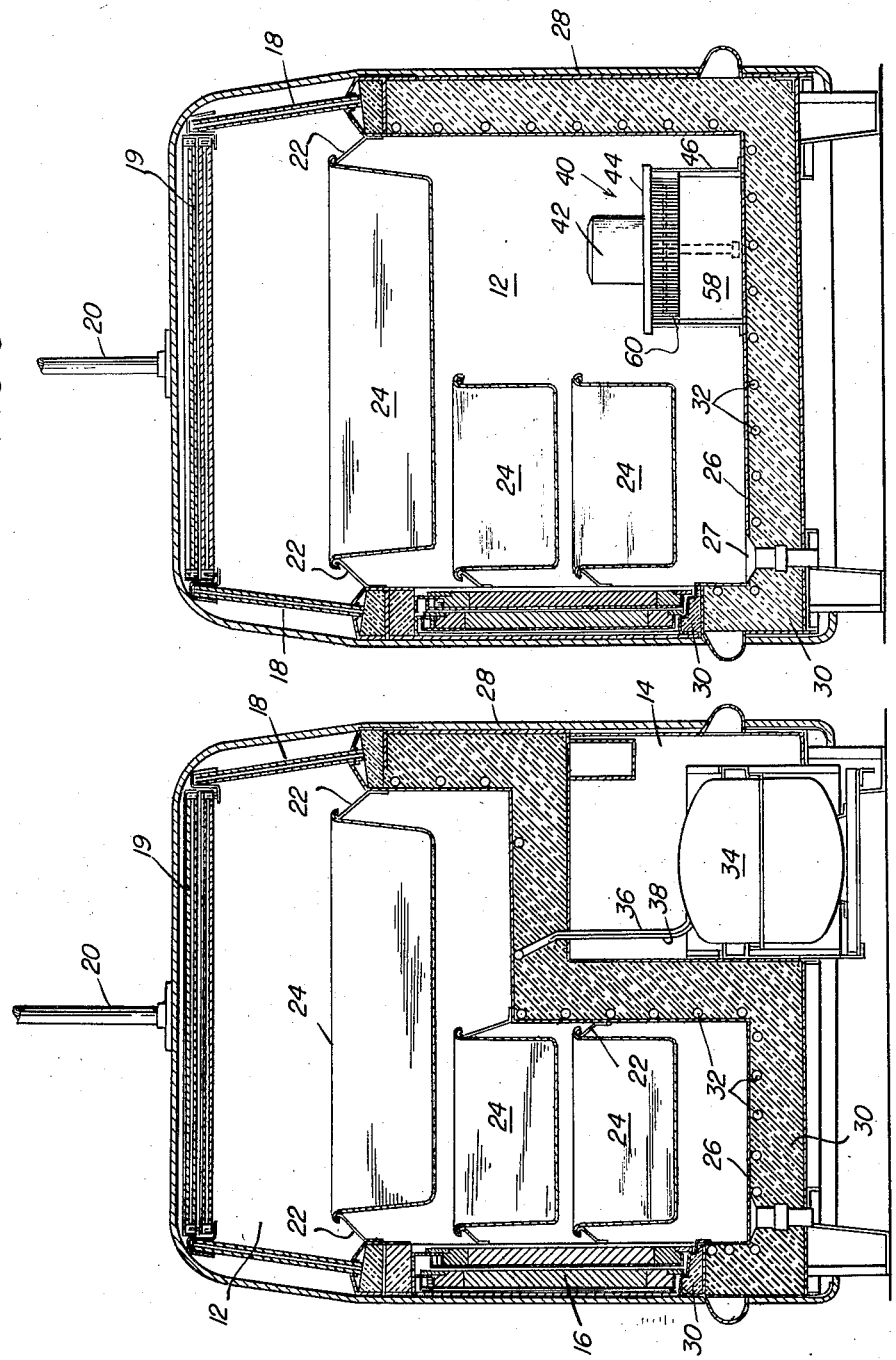

2,890,680

METHOD FOR THE PRESERVATION OF LIVE CRUSTACEA SUCH AS LOBSTERS

Sam Malkin, Brooklyn, N.Y., assignor to Lobstaire Inc., New York, N.Y., a corporation of New York Application February 21, 1957, Serial No. 641,695

6 Claims. (Cl. 119—2)

The present invention relates to processes for preserving crustacea and, more particularly, to a process for the live preservation of lobsters and the like.

The appreciation of crustacea meat, and particularly lobster meat, as a culinary delicacy is well established. It is also well established that the quality of the meat from lobsters recently removed alive from their habitat and subjected to immediate preparation is considered superior, at least by substantial numbers of consumers, over that preserved by tinning and other means. As a result of this, means and methods have been devised to ship and store lobsters alive and in conditions which emulate their natural environment. For the most part these efforts have taken the form of immersing the lobsters in sea water, or in seaweed, sawdust or other absorbent materials saturated with sea water. Although representing significant advances in the art, these efforts, nevertheless, suffer certain drawbacks. To particularize, lobsters retained in immersed conditions and not provided sustenance, necessarily suffer a steady decline in vitality. Further decline results from the lobster moving about, which is in turn increased by outside aggravation such as is had in immersion preservation modes in which a recurring or continuous current is set up in the preservation liquid because of intermittent or continuous circulation of the liquid by which to purge it. This decline in vitality is in turn conducive to absorption of salt water into the meat possibly through osmotic action, adversely affecting the qualities of texture and taste of the meat. Another equally serious result from immersion preservation is that the lobsters necessarily come in contact with their excretions causing the quality of the meat to be greatly reduced and considered by some to be unfit for human consumption.

Accordingly, it is a principal object of the present invention to provide a unique process by which lobsters can be preserved alive for greater periods of time.

Another object is to provide a process by which lobsters are preserved to provide meat manifesting remarkable taste and texture qualities substantially equal to those of lobsters upon being freshly taken from their native environment.

Still another object is to provide a process for the preservation of lobsters which is a marked economic and technological advance over prior methods.

Other objects will in part be apparent and in part be pointed out hereinafter.

The invention accordingly comprises the several aspects and the relation of one or more of such aspects with respect to each of the others thereof, which will be exemplified in the process hereinafter disclosed, and the scope of the invention will be indicated in the claims.

The objects of the present invention are accomplished by exposing crustacea, particularly lobsters, in a confined space to an atmosphere comprising an aerosol at a temperature of the order of 38° F.–45° F. The aerosol constitutes a gaseous phase, which can be air or other respiration supporting oxygen-containing mixtures, and a liquid phase constituting suspended fine particles of aqueous saline solution, preferably a sodium chloride solution, the sodium chloride solute constituting between 10%–13% by weight of the solution. In addition to sodium chloride other salts such as are found in ocean water, for example soluble iodide and magnesium salts, can be present in the saline solution.

The amount of saline solution present in the desired aerosol is such as to provide deposition of saline solution on the lobsters resulting in their being moistened, as distinguished from being immersed in solution. The temperature at which the lobsters, and consequently the aerosol, are maintained, is also important to the success of the present invention. For present purposes it has been determined that a temperature of the order of 38° F.–45° F. is critical as contributing most significantly to an improved meat product, it having been found that at this temperature the lobsters undergo retardation of metabolism resulting in their longer survival with less damage caused to and by themselves, the prescribed range of temperature being somewhat extended to offset variations in temperature resulting from seasonal or locality variations. It is desirable to maintain a substantially constant temperature in the confined space. The desired temperature may be maintained by introducing cooling means in the confined space, or by cooling the saline solution before atomization, or by a combination of both. Temperature and humidity are interrelated phenomena. Because of the presence of liquid water in the saline phase of the aerosol the selected temperature will govern both the absolute and relative humidity in the confined space, each being that of saturation.

In order to provide an aerosol of saline solution, an aqueous solution of the desired proportions of solute, in this case sodium chloride, preferably in an amount equivalent to 10%–13% by weight of the solution is atomized in fine vapor or mist form into a substantially enclosed atmosphere surrounding the lobsters. In order to ensure that the lobsters will not become immersed in the liquid which deposits from the aerosol, the lobsters are kept in an elevated position on racks, grills, or gratings, or other suspension means provided for this purpose and a drain or sump is provided as a run-off for deposited liquid which drains from the lobsters.

For a fuller understanding of the nature and objects of the invention, reference should be had to the following detailed description taken in connection with the accompanying drawing in which:

Fig. 1 is a front elevational perspective of an embodiment of a lobster preservation case which may be employed to advantage in practice of the process of the invention;

Fig. 2 is a sectional view, with parts broken away, taken substantially along line 2—2 of Fig. 1;

Fig. 3 is a sectional view, with parts broken away, taken substantially along line 3—3 of Fig. 1; and Fig. 4 is an enlarged vertical section, with parts broken away, illustrating an embodiment of atomizing means which may be utilized in the preservation case illustrated in Figs. 1, 2 and 3 for practicing the process of the present invention.

Referring to the drawings, in which like numerals identify similar parts throughout, it will be seen that, as illustrated in Figs. 1–4 inclusive, the present invention may be practiced by employment of an insulated case generally shown at 10, comprising a confined space or preservation compartment 12, and a compartment 14 for containing the refrigeration compressor shown particularly in Fig. 2. Preservation compartment 12 is designed to provide a confined space, but it is not necessary that the space be completely or hermetically sealed. Sliding doors 16, 16 or other suitable entry means are provided for ready access to the preservation compartment. In addition, the top of preservation compartment 12 preferably is defined by sloping front and back top glass panels 18, 18 and a flat top which may be a pair of sliding glass panels 19, 19, to facilitate display of the crustacea and access thereto. Fluorescent light equipment 20 may be provided above the preservation compartment 12 to enhance the display. Within preservation compartment 12 support means or brackets 22—22 are provided on which to mount baskets, racks or other shelf means 24—24 on which to rest the lobsters and ensure against their immersion in any liquid which might collect. The bottom of preservation compartment 12 shown generally at 26 serves as a collection surface or drip pan on or into which the deposited liquid gathers to be in turn carried off through drain 27 for ultimate collection in a sump, or other like means not shown.

Certain of the walls of the preservation compartment 12 preferably are defined by slabs of insulation or spaced sheathing between which insulating material is packed. Bottom pan wall 26, back wall 28 and end walls 29, 29 may be so formed, with insulation packing 30 having embedded therein coils 32—32 through which to circulate heat transfer means or refrigerant. Circulation of refrigerant is maintained from and to compressor 34 located in refrigeration compartment 14, as shown in Fig. 2, by supply and return lines 36 and 38. The refrigeration equipment and the refrigerant are the usual commerical type adapted for use in the present invention. The lobsters in preservation compartment 12 should be provided with ample gaseous oxygen. Supply of oxygen to the compartment may be accomplished by incidental seepage of air or oxygen into the compartment or by means of forced flow of air and exhaust respectively through inflow and exhaust parts in the compartment. Provision of oxygen may also be accomplished by chemical means, as by introducing oxygen liberating compounds into the compartment, as for example, a component in the saline solution atomized into the compartment. The described mechanical means has the direct ancillary function of removing the exhalent of the lobsters. One may also secure removal of exhalent by physical or chemical absorption. Thus, a supply of slaked lime in a porous container can be located in the preservation compartment to remove excess carbon dioxide.

The preservation compartment 12 is further provided with an atomizing means 40 shown generally in Fig. 3 and in detail in Fig. 4. This is preferably in the form of a centrifugal atomizer having a motor 42 supported on platform 44 carried by legs 46—46. Motor drive shaft 48 carries spinning disk 50 and depending standpipe 52 with impeller head 54 being mounted on the bottom end of the latter. By the rotation of disk 50, standpipe 52 and impeller head 54, saline solution 56 stored in container 58 is forced to rise through the standpipe to the top surface of the spinning disk and then through breaker comb ring 60 surrounding the disk where impact generates a mist which enters the atmosphere of preservation compartment 12 and in conjunction therewith creates the desired aerosol. As shown, spinning disk 50 rotates in a compartment defined between a sectional divider 62 and platform 44, surrounded by breaker comb ring 60. Sectional divider 62 has a gasketted opening shown at 64 through which rotating standpipe 52 downwardly protrudes for immersion of its lower end, and impeller head 54 carried thereby, in the body of saline solution 56. For present purposes it has been found that container 58 may have a capacity as to be capable of holding on the order of ten gallons of saline solution, which is sufficient for a week's supply of saline solution necessary for the preservation of some 250 pounds of lobsters when the present invention is practiced.

Through utilization of the process of the present invention many benefits result. Among these is that the meat of the lobster has improved qualities of edibility. Retention under the conditions of the invention, even of those few lobsters which may expire while being preserved according to the present process, results in meat which has superior qualities of edibility, to that of lobsters which have been preserved alive under immersion conditions for a like period.

Lobsters subjected to the present invention have been found to live longer and to have better quality meat than those maintained by previously adopted methods because of the retarded metabolism which results from the continuous subjection of the lobsters to temperatures of about 38° F.–45° F., absence of immersion conditions, and contact with saline solution aerosol while providing an adequate supply of oxygen. Also, the quantity of meat is greater because under these conditions the lobsters are in a quiescent state with the result that they do not attack and damage themselves or one another. Immersion conditions while under the lowered metabolism state results in excessive and undesirable hydration.

Finally, the present invention is a marked improvement from an economic standpoint. By the present process 250 pounds of lobsters can be preserved alive per week on an expenditure of ten gallons of saline solution. Immersion processes, on the other hand, require some 250 gallons of water for performance thereof over a like period. The present invention, because it requires such a low expenditure of saline solution, facilitates a single usage of the solution, thereby eliminating pollution of the lobsters by contact with their excretions, the same being washed away by the deposited solution as it contacts the crustacea and drains off to collection. This is in contrast to immersion preservation where the lobsters are subjected to prolonged contact with their excretions.

It will thus be seen that the objects set forth above, among those made apparent from the preceding description, are effectively attained and, since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. A process for the preservation of live crustacea which comprises maintaining the crustacea in a confined space at a temperature in the range of about 38° F. to 45° F. in an aerosol said aerosol comprising air having an aqueous solution of sodium chloride dispersed therein in atomized form; and continuously draining said crustacea.

2. A process for the preservation of live crustacea which comprises maintaining said crustacea in a confined space at a temperature between about 38° F. to 45° F. and in the presence of oxygen while injecting in atomized form into said confined space an aqueous solution.

3. A process for the preservation of live crustacea comprising the steps of confining live crustacea in an atmosphere, wetting said crustacea by spraying with an aerosol of aqueous saline solution at a temperature in the range of 38° F. to 45° F., and continuously draining said aqueous solution from said crustacea.

4. A process for the preservation of live crustacea as defined in claim 3 in which said aqueous saline solution comprises a saline solution including as a solute sodium chloride equivalent to about 10%–13% by weight of said solution.

5. A process for the preservation of live lobsters which comprises maintaining the lobsters in a substantially confined atmosphere containing oxygen having a temperature of between 38° F. to 45° F., spraying in said atmosphere an aqueous saline solution in aerosol form, and continuously draining said aqueous solution from said lobsters.

6. A process for the preservation of live crustacea comprising, placing said crustacea in a confined space; injecting at 38° to 45° F. in an atomized form an aqueous solution of sodium chloride into said space; introducing air into said space; cooling said crustacea to a temperature between 38° and 45° F.; and continually draining said aqueous solution from said crustacea.

References Cited in the file of this patent
UNITED STATES PATENTS

| | | |
|---|---|---|
| 1,248,169 | Schnoor | Nov. 27, 1917 |
| 2,302,336 | MacDonald | Nov. 17, 1942 |
| 2,563,364 | Proctor | Aug. 7, 1951 |
| 2,751,882 | Coyner | June 26, 1956 |